United States Patent [19]

Stevens et al.

[11] Patent Number: 4,525,101

[45] Date of Patent: Jun. 25, 1985

[54] DRILL STRING DEPLOYMENT OF CABLE PULLING TOOL

[75] Inventors: James W. Stevens; Ray R. Ayers, both of Houston, Tex.

[73] Assignee: Shell Oil Company, Houston, Tex.

[21] Appl. No.: 394,034

[22] Filed: Jun. 30, 1982

[51] Int. Cl.³ ............................................... F16L 1/04
[52] U.S. Cl. .................................... 405/169; 405/185
[58] Field of Search ............... 405/158, 169, 170, 185; 166/343, 344, 347

[56] References Cited

U.S. PATENT DOCUMENTS

| | | | |
|---|---|---|---|
| 4,075,862 | 2/1978 | Ames | 405/169 |
| 4,120,171 | 10/1978 | Chateau et al. | 405/169 |
| 4,315,702 | 2/1982 | Moe et al. | 405/170 |
| 4,363,566 | 12/1982 | Morton | 405/169 |
| 4,436,449 | 3/1984 | Smoot et al. | 405/170 |

Primary Examiner—David H. Corbin

[57] ABSTRACT

A method and apparatus are provided for positioning, aligning and interfacing a towed pipe segment to a previously installed pipe segment utilizing mating alignment sleds, one sled being attached to the trailing end of one incoming pipe segment and the other sled being attached to the leading end of the previously laid pipe segment, by connecting and drawing the alignment sleds together into a mating position and thereby aligning and connecting the two pipe segments.

7 Claims, 9 Drawing Figures

LINEAR WINCH 30 (SEE FIG. 4)

32

15

33 CONNECTOR

FRONT HYDRAULIC SLIPS 41

FRONT HYDRAULIC CYLINDERS AND SLIP CROSSHEAD 43

42 REAR HYD. SLIPS

REAR HYD. CYLINDERS AND SLIP CROSSHEAD

15 PULL-IN CABLE

WINCH FRAME

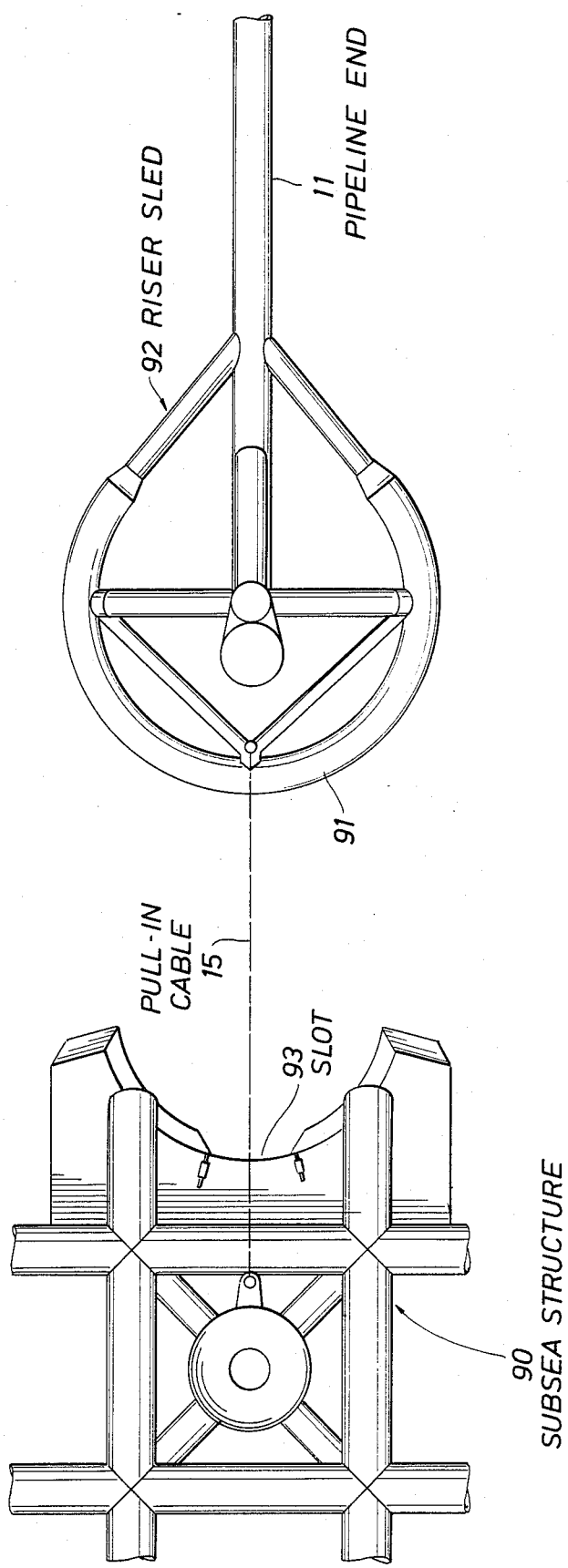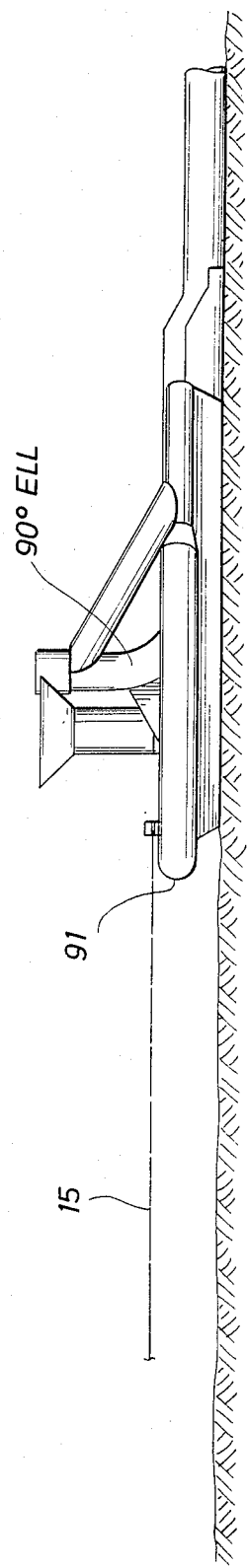
FIG. 9

DRILL STRING DEPLOYMENT OF CABLE PULLING TOOL

BACKGROUND OF THE INVENTION

The problems of positioning, aligning and interfacing a towed pipe string offshore to a previously installed pipe segment are substantial. Strings of relatively stiff, large diameter pipe, several miles in length, are assembled and tested at a suitable shore facility and then towed for end-to-end alignment and connection in water depths up to 2000 feet. On-bottom connection of such pipe is both expensive and time-consuming and requires that the candidate connection system be both technically and economically sound. While there is no single solution for all deepwater subsea connection situations, in accordance with the present invention a connection system has been developed that appears to solve many of the needs of the art.

SUMMARY OF THE INVENTION

The present invention pertains to a method and apparatus for positioning, aligning and/or interfacing a towed pipe string to a previously installed pipe segment in an offshore environment.

More specifically, the present invention provides a method and apparatus for aligning a pipe segment with a previously installed pipe segment by providing mating alignment sleds, one sled being associated with the trailing end of the pipe segment and the other sled being associated with the leading end of the pipe segment; deploying a cable between the alignment sleds; and drawing the alignment sleds together into a mating position to align the two pipe segments. Preferably, a cable pulling tool is utilized to connect the cable first to one alignment sled and then to land on the other alignment sled, then to tension the cable and finally draw the alignment sleds together. More preferably, the cable pulling tool is positioned by means of a drill string from a drilling vessel.

BRIEF DESCRIPTION OF THE DRAWINGS

FIG. 8 reveals pipe to structure pull-in.

FIG. 9 shows pipe with riser base pull-in.

DESCRIPTION OF PREFERRED EMBODIMENTS

Figure 1:
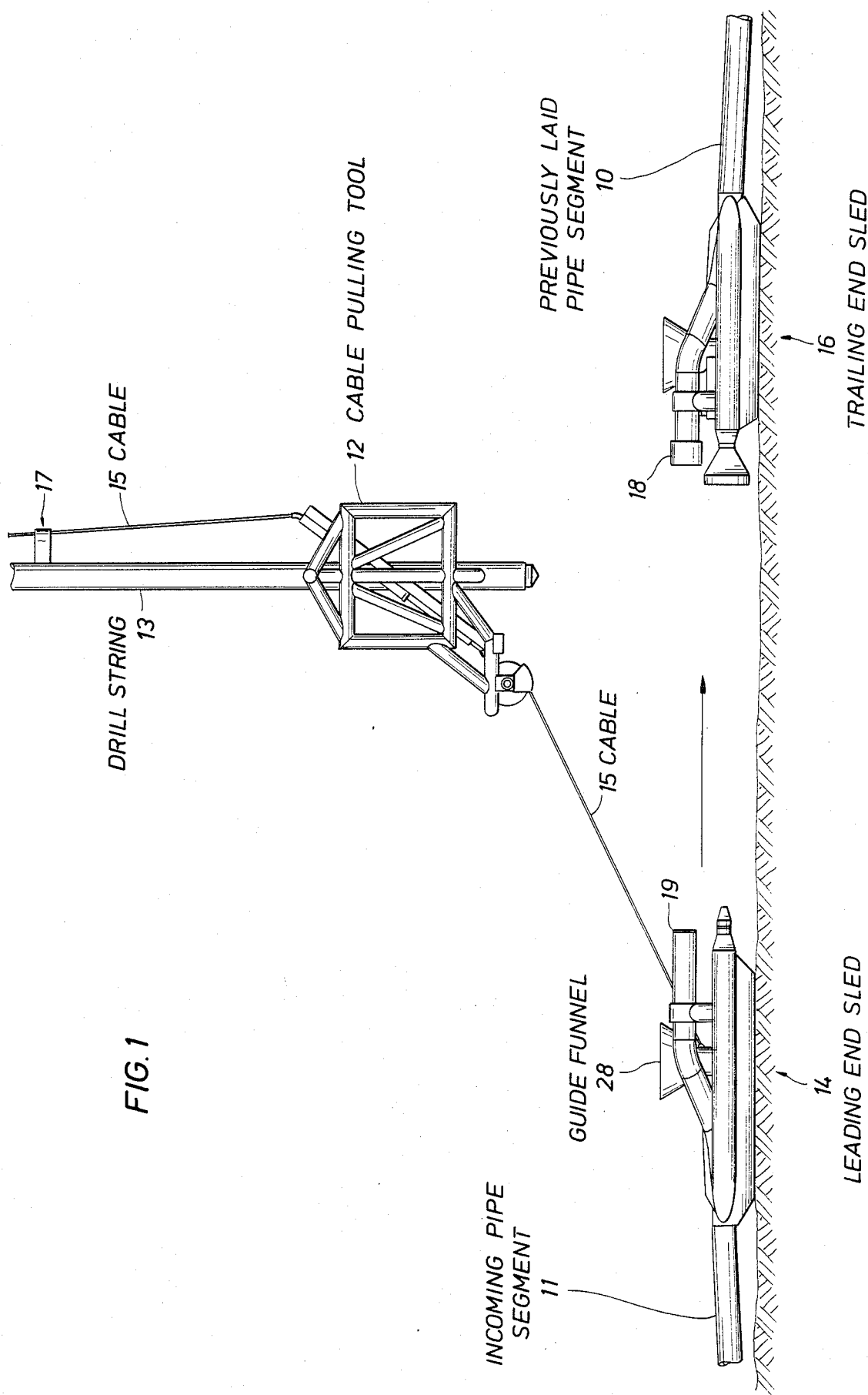
FIG. 1 shows in profile the cable handling strategy using drill string deployment of cable and tools.

The alignment/connection operation of the present invention begins with the connection vessel (not shown), equipped with acoustic positioning equipment, positioning itself over the trailing end of the previously laid pipe 10. Transponders (not shown) are placed on and near the pipe ends to permit referencing/positioning operations. The target area for the arriving pipe 11 is established and the connection vessel assists the tow vessel (not shown) in landing the arriving pipe leading end 11 on target, approximately 1000±500 feet from the trailing end 10 and within an envelope of ±10 to 15 degrees on either side of the previously installed pipe string 10 center line. Next, with the leading end 11 of the pipe string satisfactorily positioned on bottom, as confirmed from the connection vessel, the tow line (not shown) is released from the leading end 11 and recovered by the tow vessel. In the next step, the cable pulling tool 12, containing a linear winch 30 (see FIG. 4) or rotary winch (not shown) and other connection equipment, is made up on drill pipe 13 and run to near bottom in the area of the leading end sled 14. The cable 15 to be used in pulling the two pipe ends 10 and 11 together is secured in the cable pulling tool 12 at the bottom. The term "cable" is intended to include any chain, cord, line, string, strand, ligament, rope, wire, strap, braid, and the like. This cable 15, which was previously threaded through the linear winch 30, parallels the drill pipe running string 13 through guide eyes 17, leading to a constant tension takeup winch on the connection vessel (not shown). If a rotary winch is used instead of a linear one, the excess cable is stored on the winch drum and not brought up the drill string.

Using guidelineless well reentry procedures such as well known in the art, the cable pulling tool 12 is landed on the leading end sled 14 and the cable end 15 is set and locked. The cable pulling tool 12 is then lifted off-bottom 25 to 75 feet, then the rig begins moving in the direction of a trailing end frame or sled 16 of the previously installed pipe segment 10. As the drill-string-supported package 12 is repositioned by changing the rig's surface location, cable 15 is paid out and the string 13 and tool 12 are rotated 180 degrees while leaving the leading end 11.

Tension maintained in the pulling cable 15 during the repositioning maneuvers will slightly deflect the bottom of the drill pipe 13, producing a bow in the running string. By controlling the cable tension, this arrangement can be used to damp out pendulum-type oscillations of the equipment package and make possible more precise adjustments in its location when landing on the trailing end sled 16.

Once the tool 12 is positioned on location above the sled 16, it is landed, rotated (as necessary) to correct orientation and latched in place. A manned submersible (not shown) or a free swimming remotely controlled vehicle (not shown) may be housed in the cable pulling tool and may be deployed from the cable pulling tool to provide both a close by observation capability (to confirm that the pulling cable is not fouled and other equipment is ready for a pulling operation) and, if necessary, to provide a backup capability to planned subsea operations.

Pulling the sleds 14 and 16 together, is accomplished by remote operation of the linear winch 30 (FIG. 4) or rotary winch housed in the cable pulling tool 12. Power for the winch operation, in the form of high pressure hydraulic fluid is provided through the bore of the drill pipe 13 from pumps on the connection vessel (not shown). Control and monitoring of winch operations is accomplished through a control and instrumentation umbilical (not shown) secured to the drill pipe running string 13. The umbilical may also provide control and feedback signals for other equipment on the tool, video signals from television cameras, responder or hydrophone circuits, and signal paths needed in the makeup and testing of the mechanical connector once the sleds are joined.

As the leading end sled 14 slides across the bottom, slack pull-in cable from the linear winch 30, if used, is recovered to the surface through guides 17 on the drill string. This provides a check on pulling speed and closure distance between the sleds 14 and 16.

Final alignment for the connector makeup is achieved as guide arms 24 and 25 on the leading end sled are pulled into funnels 26 and 27 on the trailing end sled 16. The linear winch 30 provides adequate pull-in cable tension to bring the connector halves 18 and 19 into final alignment by inducing bending in the towed pipe segment 11 through the alignment sled 14. Confirmation that the connector halves 18 and 19 are correctly aligned and engaged for actuation may be provided by television on the cable pulling tool 12 or by inspection with a manned or remotely operated vehicle (not shown).

The connector is made up and tested through power, control and instrumentation links with the cable-pulling tool 12. Hydraulic power and surface control and confirmation are provided by the umbilical. The backup for the connector actuation and testing may be provided using a subsea vehicle.

The final step in the sequence occurs when the pull-in cable 15 is released from the leading end sled 14 and the cable pulling tool 12 is recovered to the surface. Sea floor components of the referencing and positioning system are released and recovered and the connection vessel moves off location leaving the completed connection on bottom.

Figure 2:
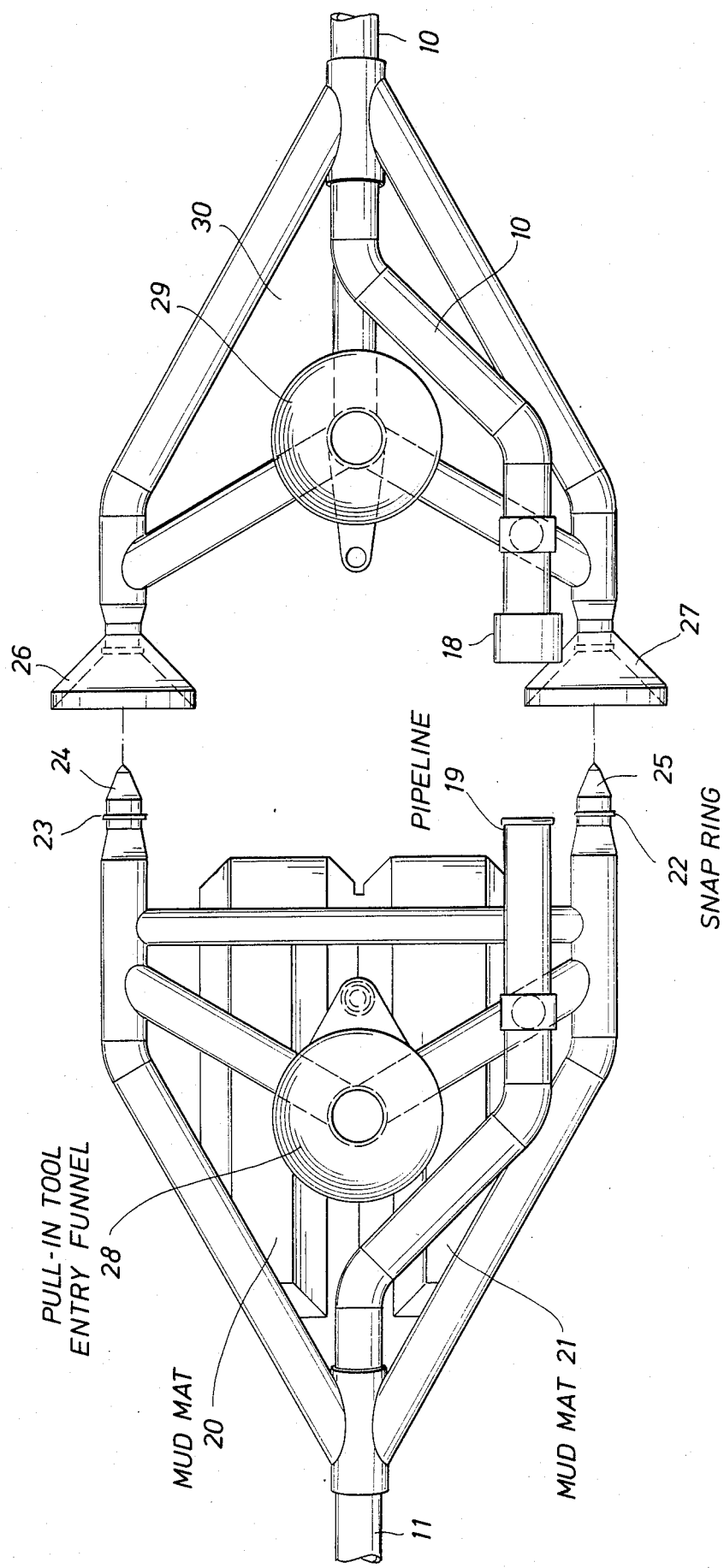
FIG. 2 provides a plan view of the pipeline end sleds of FIG. 1.

Plan views of the leading and trailing end sleds 14 and 16 are shown in FIG. 2. These sleds may have an outrigger span of, for example, 20 feet to provide for reaction points to exert in-plane (plan view) bending (in excess of the yield moment of the pipe string if necessary) during pull-in to achieve final connector alignment and engagement. The pipeline segments ends 11 and 10 are offset transversely and elevated to permit towing from the center line of the pipe strings and to keep the connector halves 18 and 19 out of the mud. Twin mats 20 and 21 are hinged from the front to lower the center of gravity of the leading end sled 14 when the pipe segment 11 is towed out in the "nose up" fashion. This arrangement prevents the pipe sled 14 from rolling up during tow-out. The mud mats 20 and 21 can be adjusted by hydraulic cylinders (not shown) at the back to assist in final alignment, if desired. Snap rings 22 and 23 can be provided on the male probes 24 and 25 of sled 14 to lock into the mating alignment funnels 26 and 27 on the trailing end sled 16. The cable-pulling tool entry funnel 28 has an alignment slot (not shown) in a cylindrical sleeve to lock in position during rotational alignment of the cable pulling tool. A similar funnel 29 is on sled 16. Not shown in the figures are buoyancy modules which are required to offset some of the submerged weight of the sled. The trailing end sled 16 is quite similar in design to the leading end sled 14 except the mud mat 30 is fixed and the outrigger funnels 26 and 27 replace the outrigger pins 24 and 25. Drag chains could be alternatively used instead of mud mats, provided the structure above is buoyant.

Figure 3:
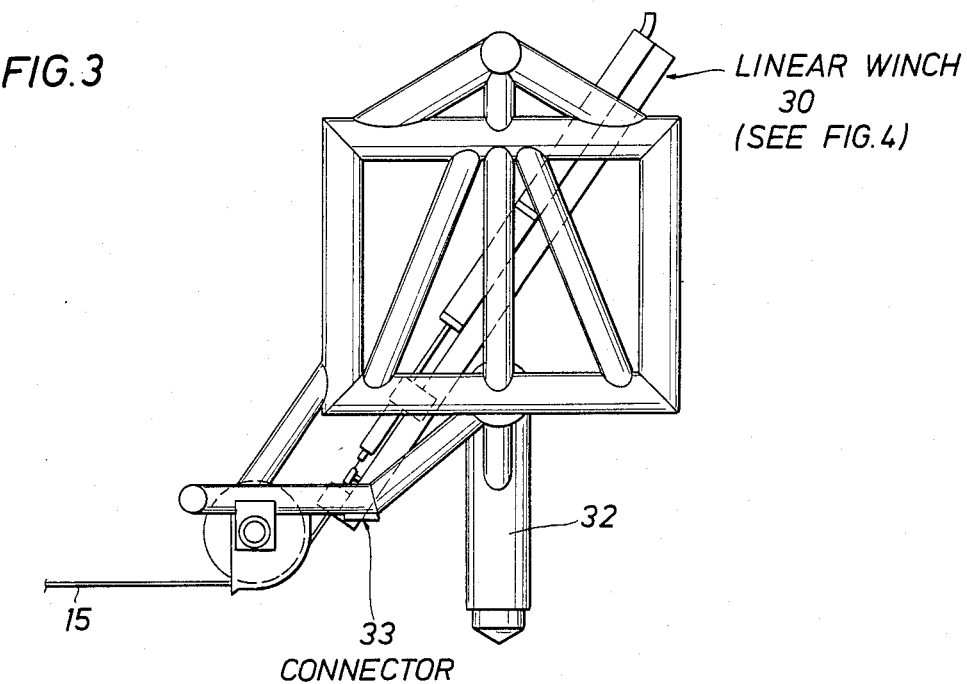
FIG. 3 discloses in profile a pull-in tool.
Figure 4:
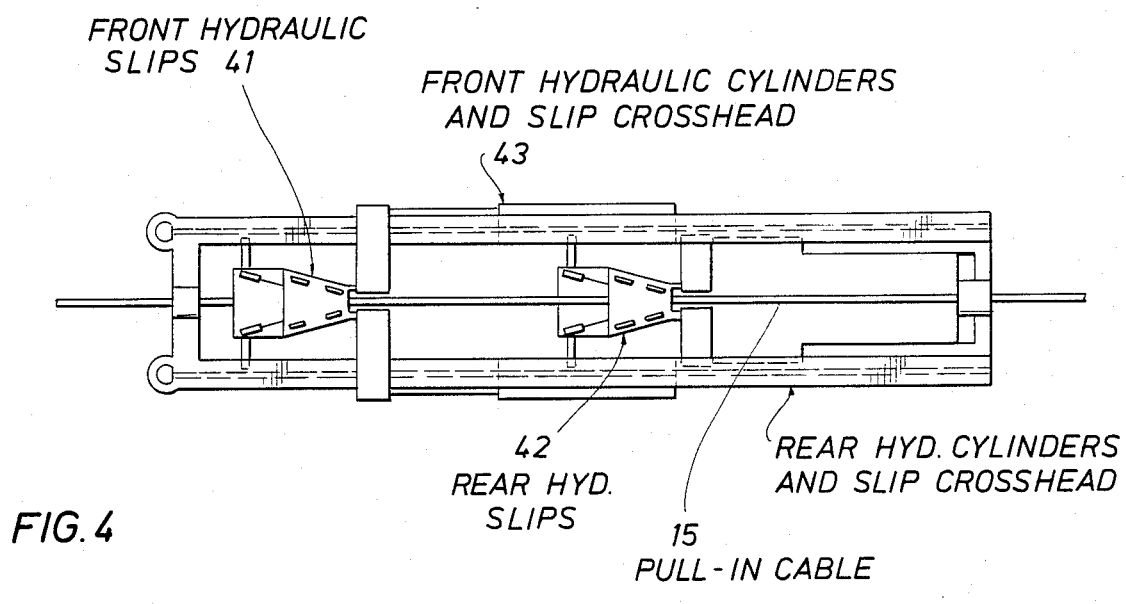
FIG. 4 shows a winch used in the pull-in tool of FIG. 3.

The cable pulling tool 12 shown in FIG. 3 has as its major components a linear winch package as shown in FIG. 4. As indicated previously, a rotary winch might alternatively be used. Not shown is a standard acoustic/TV re-entry guidance device, located within the entry probe 32. The linear winch 30 can be inclined in the framework of the cable pulling tool to minimize the overall tool height and thus reduce overturning moments of the tool and the sled with high bottom currents). This inclined configuration, if used, allows a simple cable load path through the pull-in connector 33 to the load transfer sleeve. Alternatively, the rotary or linear winch could be repositioned in the cable pulling tool so that a TV camera can be lowered through the drill string to observe the connection area. Also, provision is made in the cable pulling for location of a small tailored observation-type remotely-operated vehicle as a part of the tool (not shown).

As shown in FIG. 4, the cable pulling tool 12 has as its primary component a linear winch 30. With the assembly of front and rear hydraulic slips 41 and 42 and from hydraulic cylinders and slips cross head 43, the cable 15 is pulled in on a continuous basis in a "hand over hand" rope-climbing manner. Other components of the cable pulling tool are derived to make and test the connector 18–19 (if a mechanical one is used) and various forms of instrumentation. Additionally, a small observation remotely-operated vehicle can be based on the tool and equipped with sufficient tethered umbilical from the base (on the cable tool) to enable the vehicle to swim around and observe close-in operations.

Figure 5:
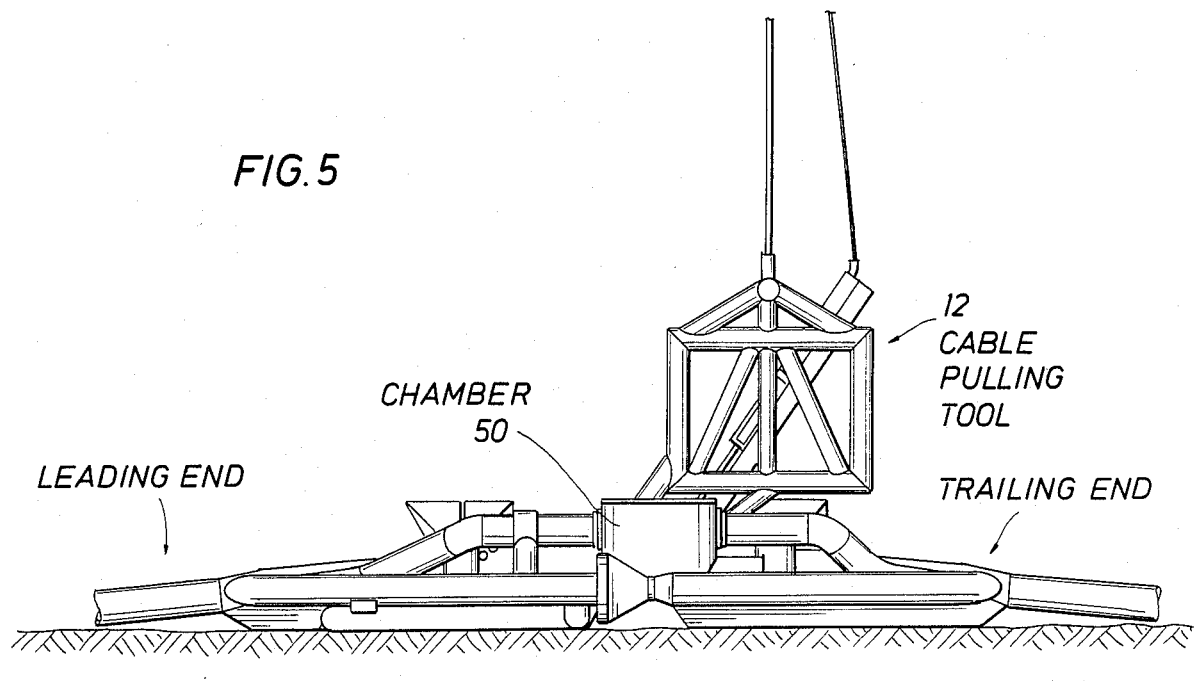
FIGS. 5 and 6 depict in profile the use of a welding bell with the apparatus of the present invention.
Figure 6:
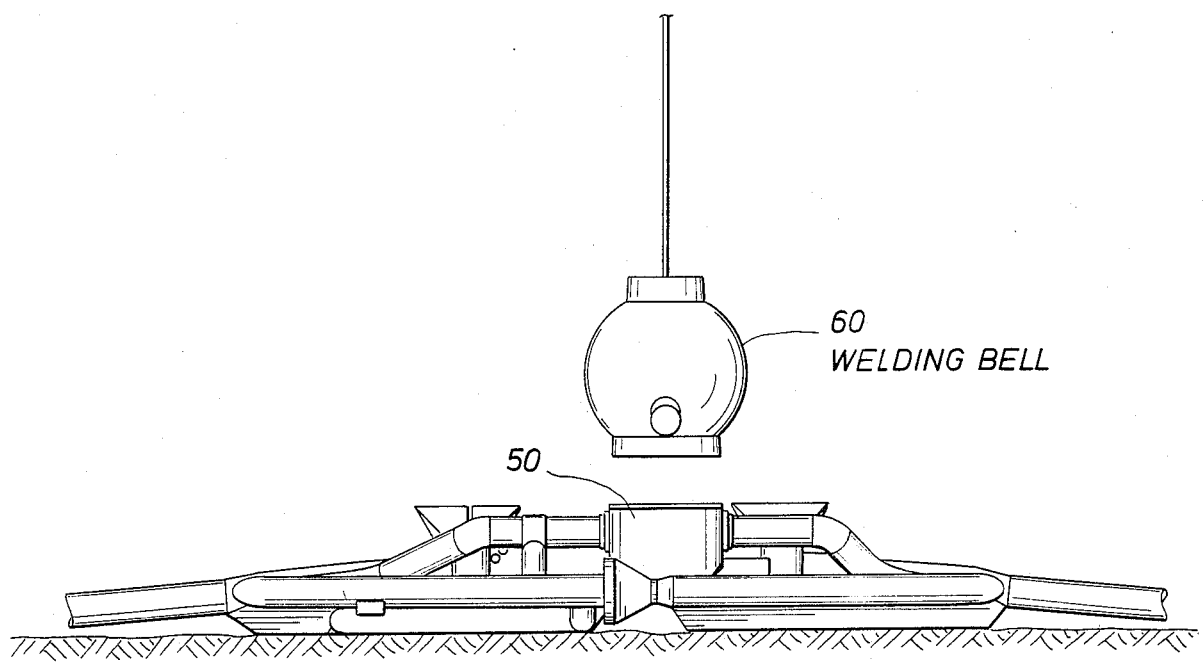

FIGS. 5 and 6 pertain to apparatus for making one-atmosphere welded connections using the present invention. Most of the equipment to achieve the welded connection is similar to that above discussed. The two pipeline ends 10 and 11 are prepared with weld bevels. A weld chamber base 50 is located on the trailing end 14 in a secured position. Plugs (not shown) are set in each half of the pipe. After the two pipe ends are pulled together and mated using the pull-in tool 12, the welding chamber base is centered over the pipe joint. The alignment tool 12 is then recovered to the surface. A separate welding chamber 60 is then lowered, lands on the welding base 50 and actuates chamber/pipe seals. The integrity of these seals is tested and the chamber is dewatered in preparation for the welding operation. The welding chamber 60 contains all the welding equipment, with an umbilical to the surface which will support life and welding in this environment. A small submarine bell (not shown) transfers personnel to this chamber. Personnel enter the welding chamber, prepare an appropriate pup joint insert and perform the welds in a dry, one-atmosphere environment. Upon completion of the welding operation the equipment is recovered, and the small welding chamber base is left as expendable equipment. Subsequently, after the pipeline is properly connected, the plugs which were used to maintain the chamber in a dry environment are deactivated and pumped out of the line.

Figure 7:
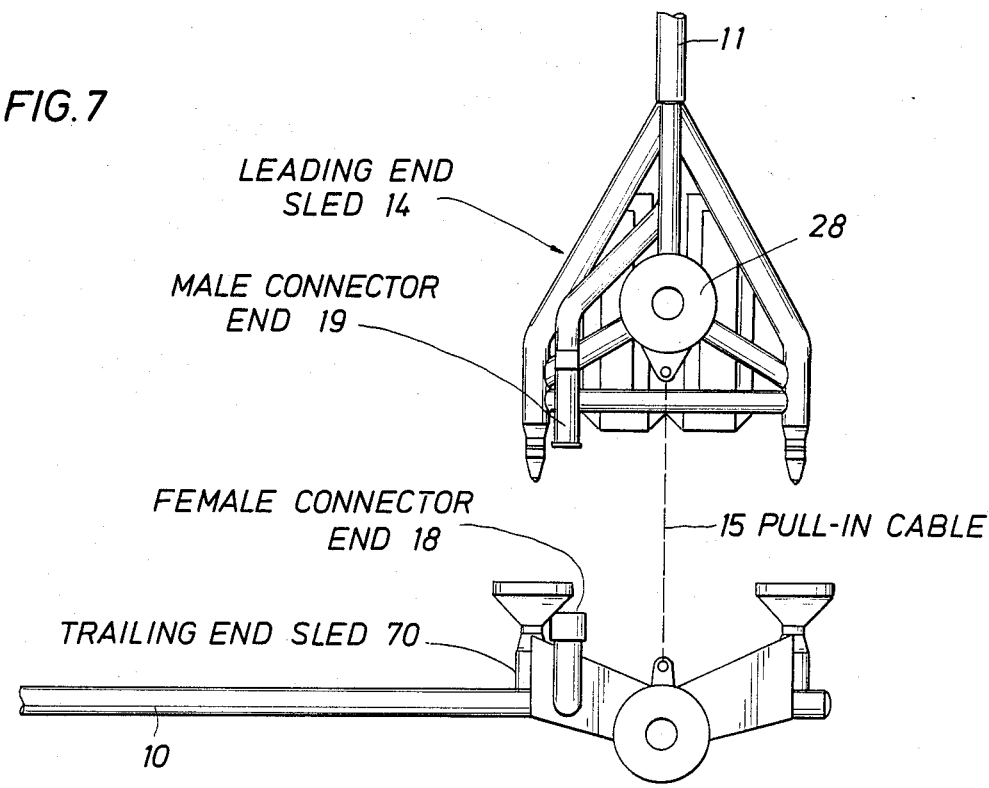
FIG. 7 shows pipe pull-in at right angles.
Figure 8:
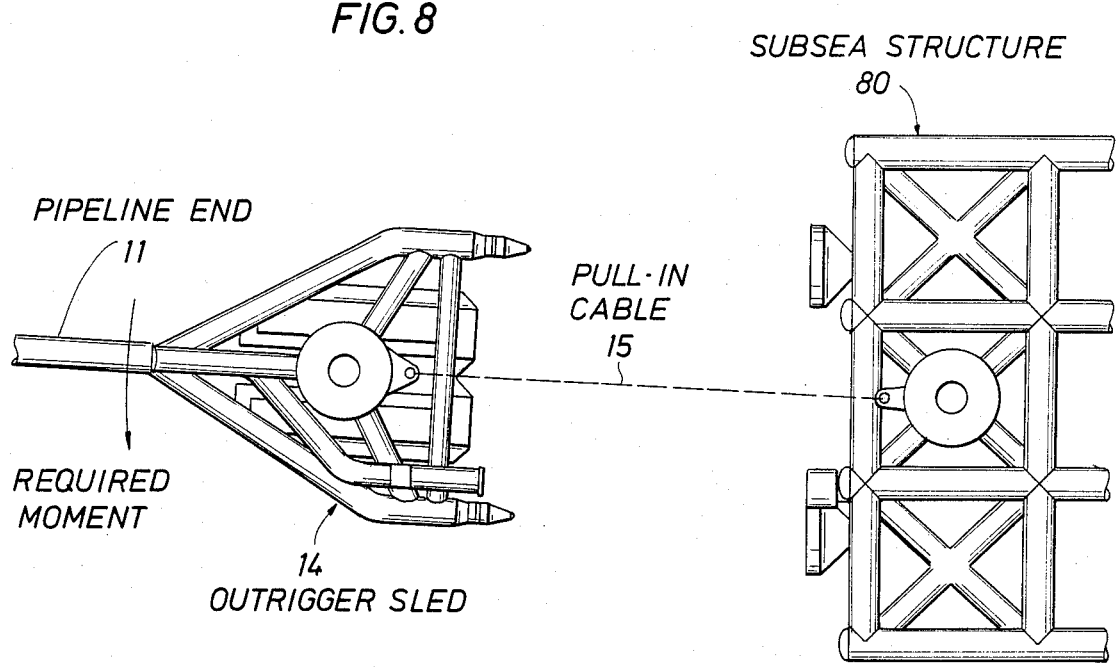

Other variations of the pipe-pulling method of the present invention are shown in FIGS. 7–9. A pipe-to-pipe pull-in at right angles is shown in FIG. 7. Right angle connections are similar to "the straight-in" pipe-to-pipe pull-in already described, but the right angle end frame 70 must be properly balanced in its submerged state to remain stable. Further, the right angle end frame 70 must be compact enough to fit through a moon pool on the connection vessel if necessary. In order to make use of previously described connection equipment, the right angle frame 70 is functionally similar to the above described trailing end frame 16.

A pipe-to-structure pull-in is shown in FIG. 8. Subsea pipelines may terminate to a number of different structures such as subsea structure 80. One of these is a subsea template. It is possible to adapt the trailing end configuration to fit in a subsea template. Thus, the pipeline construction method of the present invention is made compatible with the structural tie-in. Another variation is shown in FIG. 9 which depicts a pipe with riser pull-in. A subsea pipeline may terminate to a vertical riser 90. By configuring the riser base elbow into the end termination, a more desirable end connection arrangement is achieved. A subsea riser base does not generally require precise orientation or alignment about its vertical axis; so, if rotation is allowed then the window of acceptable approach angles for the pipe can be increased. The leading end 91 of riser sled 92, if circular shaped, can engage a similar circular shaped profile 93 in the structural anchor; thus, rotational freedom can be achieved.

Although the present invention has been described for the case of aligning and connecting large diameter pipelines, it is obvious that the same techniques and similar equipment can be used for smaller pipelines, flowlines and flowline bundles.

What is claimed is:

1. A method for aligning and pulling together a subsea pipeline segment and a previously installed subsea pipeline segment comprising:

providing mating alignment sleds, one sled being attached to the trailing end of the previously installed pipeline segment and the other sled being attached to the leading end of the pipeline segment to be aligned;

deploying a cable pulling tool at the end of a vertical pipe assembly suspended from a vessel;

landing the cable pulling tool on one alignment sled and thereby attaching a cable end to the sled using the cable pulling tool;

removing the cable pulling tool from the one alignment sled while paying out cable and then landing the cable pulling tool on the other alignment sled; and pulling the two sleds together into a mating position by means of the cable pulling tool, thereby aligning and pulling together the pipeline segment ends.

2. The method of claim 1 wherein the two pipeline ends, after being brought into alignment, are joined by welding.

3. The method of claim 1 wherein the two pipeline ends, after being brought into alignment, are joined by a mechanical connector.

4. The method of claim 1 wherein the pipe assembly is a drill string.

5. The method of claim 1 wherein a welding chamber is positioned around the adjacent pipeline segment ends, and the pipe ends are welded together.

6. The method of claim 1 wherein the previously installed pipeline segment is adjoined to a subsea structure.

7. The method of claim 1 wherein the pipeline segments are joined at a preselected angle.

* * * * *